United States Patent
Walden et al.

(10) Patent No.: US 6,456,303 B1
(45) Date of Patent: *Sep. 24, 2002

(54) METHOD AND SYSTEM FOR ACCESS OF ONLINE INFORMATION

(75) Inventors: Ralph E. Walden, Redmond; Kathleen K. Harper, Kent, both of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,259

(22) Filed: Feb. 9, 1998

(51) Int. Cl.[7] ............................................... G06F 3/00
(52) U.S. Cl. ..................... 345/705; 345/712; 345/760; 345/788
(58) Field of Search ................. 345/336, 337, 345/338, 339, 340, 342, 347, 354, 356, 357, 705, 707, 708, 712, 714, 764, 781, 788, 792, 798–800, 808, 809, 840, 853–855, 760

(56) References Cited

U.S. PATENT DOCUMENTS

| | | | |
|---|---|---|---|
| 5,122,972 A | * 6/1992 | Richards et al. | 345/712 |
| 5,442,759 A | * 8/1995 | Chiang et al. | 705/1 |
| 5,577,186 A | * 11/1996 | Mann, II et al. | 707/500.1 |
| 5,581,684 A | * 12/1996 | Dudzik et al. | 345/708 |
| 5,715,415 A | * 2/1998 | Dazey et al. | 345/708 |
| 5,721,853 A | 2/1998 | Smith | 345/803 |
| 5,754,176 A | 5/1998 | Crawford | 345/711 |
| 5,760,771 A | 6/1998 | Blonder et al. | 345/854 |
| 5,799,292 A | 8/1998 | Hekmatpour | 706/11 |
| 5,801,702 A | * 9/1998 | Dolan et al. | 345/854 |
| 5,825,355 A | * 10/1998 | Palmer et al. | 345/712 |
| 5,825,356 A | * 10/1998 | Habib et al. | 345/712 |
| 5,835,092 A | * 11/1998 | Boudreau et al. | 345/808 |
| 5,861,884 A | * 1/1999 | Fujioka | 345/705 |
| 5,877,757 A | * 3/1999 | Baldwin et al. | 345/705 |
| 5,933,140 A | * 8/1999 | Strahorn et al. | 345/712 |
| 6,009,429 A | * 12/1999 | Greer et al. | 707/10 |
| 6,014,134 A | * 1/2000 | Bell et al. | 345/705 |
| 6,236,989 B1 | * 5/2001 | Mandyam et al. | 707/4 |
| 6,259,445 B1 | 7/2001 | Hennum et al. | 345/709 |

* cited by examiner

Primary Examiner—Crescelle N. dela Torre
(74) Attorney, Agent, or Firm—Banner & Witcoff, Ltd.

(57) ABSTRACT

A system and method for providing improved access to online help information is provided in a computer system. A component of Internet browser software is used to implement improved help which can take advantage of HTML links to information via the Internet. A navigational window pane and a HTML window pane are provided in a single window. A Hide/Show button allows the user to delete the navigational window pane or to simultaneously display it along with the HTML window pane. Once a user selects a topic in the navigational window pane, the corresponding content information is displayed in the HTML window pane. A help tab is embedded in a program to facilitate easy switching between help and the program. In addition, a help button is used to provide a context-sensitive embedded help window which tracks the user's activities. Calculations are performed for automatically sizing window panes in response to the Hide/Show button.

37 Claims, 15 Drawing Sheets

METHOD AND SYSTEM FOR ACCESS OF ONLINE INFORMATION

BACKGROUND OF THE INVENTION

1. Technical Field

The present invention relates generally to providing easier access to online information by a computer user. More specifically, the present invention provides a user-friendly interface to a computer user seeking online or help information pertinent to a task or operation that the user wants to perform or understand. In addition, the present invention provides the capabilities for programs and help authors to create named window types, and define the properties of those windows for use in providing online information to a computer user.

2. Related Art

For years, software developers have sought effective ways to provide users with information concerning the operation and features of a program in a timely and effective manner. The term "program" as used here refers to a class of items, including applications software, operating systems, applets, etc. and is not limited to any particular embodiment. For example, software developers have faced the problem of providing information concerning the operation and features of a program, such as an operating system, as well as for a particular application, such as a word processor. These examples are provided as illustrations only; software developers have been challenged with finding ways to provide user information for all types of programs.

One approach to the problem is to provide user information online, for example, by including the information within the program itself. The user is then able to call up the desired information from dedicated files stored in association with the program. With such an online approach, a user typically accesses information concerning how the program operates and answers to specific questions through the use of a so-called "Help" feature. Such an on-line help feature typically includes the use of "windows."

A window is a graphical feature on a display screen, which can have borders, a particular size, placement, color and/or other unique attributes. A window generally contains its own document or messages. In window-based programs, the screen can be divided into several windows, each of which has its own boundaries and can contain a different document (or another view into the same document). Each window might also contain its own menu or other controls, and the user might be able to enlarge and shrink individual windows at will. In some programs, windows are opened side by side on the screen; in others; open windows can overlap one another. A program such as an operating system controls the display of windows by writing instructions to a graphics display mechanism; the instructions will include information regarding the placement of the window on the display screen, the characteristics of the graphics elements such as the borders, menus, buttons, etc., and the information regarding the window contents, such as a word processing file, which will be displayed within the graphical window.

Many operating systems provide services to applications that allow the application to easily create a window by providing the window characteristics, as well as information regarding moving and resizing of the window to the operating system. Thus, operating systems and application programs can "own" windows that display information for the user. In fact, a window can be created and/or controlled by any program that is capable of communicating with a graphics display mechanism.

A dialog box is a particular form of window. Typically, a dialog box is used to convey information to the user or to gather information from the user.

With the prior art help systems, a menu of available help information is typically displayed in a navigational window pane when the user requests help by accessing a displayed help button or prompt. The user can select desired information by accessing an item in the navigational window pane. This results in the display of selected information in a separate selected content information window pane. The navigational window pane may be presented in a variety of formats. For example, the navigational window pane may contain a choice of help contents, a search function for finding a specific piece of information, or a listing of frequently asked questions. The information presented in the navigational window pane may be indexed via so-called "hash functions" to the desired information itself which is displayed in the selected content information window pane. The information in the selected content information window pane is related to the navigational window pane information and is the information sought by the user.

The prior art help system is generally provided as a separate program from the program for which it is supplying help. In addition, the information provided by the prior art help system is typically stored in association with the program itself This means, for example, that the help capability is delivered to the user along with the application or operating system itself With the prior art help systems, typically no history of the user's access to help is maintained; with each help access, the previous help access is lost.

When managing windows between programs, for example, between the help program and the program for which it is supplying help, it is particularly important that a window from one program does not block a window from another program such that the user is prevented from seeing and accessing the information in the first window. In particular, many prior art help systems suffer this particular problem because the help system is completely separate from the program and/or application, and the help system competes for a location on the display screen and for control with other programs and/or applications, especially the one with which it is associated.

Many prior art systems for providing user help also suffer from the problem that a navigational window pane and a selected content information pane displaying help contents are separate windows and cannot be simultaneously displayed. An example of online help in the prior art is shown in Microsoft's WINHELP 4 software provided in Windows95. In WINHELP 4, when a user accesses the help feature, a dialog box opens displaying the list of available help information. An example of such a dialog box is shown in FIG. 1. As seen in FIG. 1, when a user requests help information, a navigational window pane is displayed containing a Table of Contents, for example. In the example shown, the user has selected the topic "Finding a file or folder." The specific help content is accessed by clicking on a "Display" button. At that point, the navigational window pane containing the Table of Contents is closed and a selected content information window pane is displayed containing the content information corresponding to the selected topic, as shown in FIG. 2. The selected content information window pane shown in the example of FIG. 2 contains information to instruct the user on how to find a file or folder. Significantly, the window panes shown in FIGS. 1 and 2 are actually separate and independent windows. It is impossible to display the selected content information pane while simultaneously displaying navigational window pane containing the help Table of Contents.

If the selected content information window pane of FIG. 2 does not contain the information needed or desired by the user, the user is required to click on the "Help Topics" button in FIG. 2 to return to the navigational window pane shown in FIG. 1. The net result is that the user is required to "jump" back and forth between the navigational window pane and the selected content information window pane to find the needed information. This procedure may be cumbersome if the user is uncertain of the topic name or is looking up multiple topics.

It should be noted that the navigational window pane of FIG. 1 may contain alternate ways to access the help information in addition to a Table of Contents. As shown in FIG. 1, an "Index" tab and a "Find" tab are provided in addition to a tab for selecting a Table of Contents. These and other additional ways of accessing the selected content information located in the selected content information window pane suffer from the same drawback as is described with respect to the Table of Contents.

Additional problems are experienced with the prior art approaches to providing online user information. For example, when accessing a help button, the user cannot access the program itself while staying within help. In other words, the user is required to close the help function in order to return to the program. FIGS. 3 and 4 depict this problem facing the user of the prior art approach to providing user help in an application. The program shown in FIGS. 3 and 4 is an application program, namely Microsoft's Excel spreadsheet software, but any program could be used for illustration. In particular, FIGS. 3 and 4 illustrate that the user who has selected help is first presented with a navigational window pane (FIG. 3) and then is provided with a selected content information window pane (FIG. 4). In order to return to the application after reviewing the selected content information window pane, the selected content information window pane must first be closed. The same is true if the user wishes to move from the navigational window pane of FIG. 3 to the application. Further, the user cannot access the application while simultaneously reviewing the selected content information window pane (or the navigational window pane), making the help feature difficult for the user to use.

In recent years, the popularity of the worldwide network of computer networks known as the Internet has grown tremendously. Much of that growth is due to the accessability of the World Wide Web, which is the open community of hypertext-enabled document servers and readers on the Internet. As a part of the web's growth, an authoring language and distribution system was developed for creating and sharing multimedia-enabled, integrated electronic documents over the web. That language is called Hypertext Markup Language or "HTML". HTML, along with software for browsing the Internet, has made possible the wide-spread access of information on the web today.

Due to the drawbacks and disadvantages associated with previous help systems, there exists a need for an improved way of providing online help information to a computer user. Moreover, there exists a need for allowing programs and help authors to create named window types, and to define the properties of those windows for use in providing online information to a computer user. Also, it is desirable that an improved help system be capable of accessing and utilizing both HTML content and the Internet.

SUMMARY OF THE INVENTION

The present invention provides improved access by a computer user to online information, and in particular to online help information. According to the present invention, a user-friendly interface is provided to a computer user seeking online or help information pertinent to a task or operation that the user is performing. In addition, the present invention provides the capabilities for programs and help authors to create named window types, and define the properties of those windows for use in providing online information to a computer user.

The improved user interface of the present invention is accomplished by providing online or help information which can take advantage of HTML and the Internet, thereby providing software developers greater flexibility and the ability to provide more timely help information to computer users. Whereas the prior art required the indexing of help navigational information into help content files which are associated with the program, the present invention uses so-called universal resource locators or "URLs" to access help information.

According to the present invention, a navigational window pane is provided within the same window as an HTML windowpane. In addition, the present invention supports intelligent tracking between the navigational window pane and the HTML window pane. In other words, whatever topic is selected from the navigational window pane is reflected in the HTML window pane's display. As a result, according to the present invention, the information displayed in the HTML window pane is synchronized to any selected topic in the navigational window pane.

A "Hide/Show" button is provided so that a user can remove the navigational window pane from the display by selecting the "Hide" button when the user is satisfied with the information displayed in the HTML window pane. Selecting the "Hide" button may result, for example, in the display of only the toolbar and the HTML window pane related to that topic. When the "Show" button is selected by the user, the navigational window pane is again displayed concurrently with the HTML window pane. Activation of the "Show" button may ensure that the entire window is displayed on the monitor screen and that no portion of the window is lost off of the edge of the screen.

By simultaneously providing both the navigational window pane and the HTML window pane to the user, the user can easily determine whether the displayed information in the HTML window pane is desired. If it is not desired, the user can quickly and readily select different information without having to change or close the window. As a result, the user is able to more easily and effectively access online information and/or use the help application than was possible with prior art techniques for providing user information.

In addition, according to the present invention, the information displayed in the HTML window pane may come from a variety of sources including the Internet, a local drive, a CD-ROM or any other indexable source. The information displayed in the HTML window pane may contain multimedia or active content data. Significantly, the information displayed in the HTML window pane may contain HTML files which can link the user to any site via the Internet. As a result, it is possible to provide a user with updated and more timely help information than was possible with the prior art because information provided via the Internet may be updated on a real time basis. Moreover, a navigational expansion can be stored as part of the user's history so that when the navigational window pane is later accessed by a user, the user can readily navigate "backwards," that is, the user can easily return to previously accessed areas within the navigational window pane, thus increasing the ease of use of the help system.

Also according to the present invention, HTML help files may be embedded into a program. Specifically, a help tab may be provided which a user can access while working directly in a program. Previously, a help button was provided which separately launched a help function, a noted problem with the prior art. When the help button was accessed, a help window was opened over the program being used, as previously described. According to this aspect of the present invention, a help tab is provided so that help can be provided to the user within the program itself. As a result, a user can easily access both the desired help and the program. In addition, the user can maintain his or her current place in a program while moving through the HTML window pane, for example.

Another feature of the present invention is provided by performing the function of the "Hide" button automatically whenever a user clicks anywhere outside the help window, thereby saving the user from having to click on the "Hide" button to hide the navigational window pane. Likewise, whenever a user requests help according to this variation of the invention, the help window automatically opens in an expanded state, that is, the help window opens with both the navigational window pane and the HTML window pane displayed. Again, in this way, the user is saved from having to operate the "Hide/Show" button. However, it should be noted that the "Hide/Show" button still functions as previously described and therefore may be accessed by the user, if desired.

Other features and advantages will become evidence through the following detailed description, figures and claims.

DETAILED DESCRIPTION OF THE INVENTION

A detailed description of the present invention, which provides increased access and useability of online information to a computer user and which also provides the capabilities for programs and help authors to create named window types and to define window properties to support increased access and usability of online information, is described below. First, a description of basic windowing concepts used with the present invention is provided. Next, the help window and Hide/Show function of the present invention are explained. A variety of options which may also be employed with the help window featuring a Hide/Show function are provided.

A program-embedded help tab is next described in accordance with the present invention. The functionality of the Hide/Show button, help tab and automatic Hide/Show button are explained. Finally the implementation of the Hide/Show functionality of the present invention is explained.

Turning to basic window concepts, the definition of a window type with the present invention may include the window's position, its size, what buttons appear in the toolbar, what tabs to display in the navigation pane, what the appearance of the window is, color and any other attribute which may be associated with a window. Authors can define a window type and save the information that defines that window type in a compiled HTML file. Programs can either define their own window types while the program is running, use a window type contained in a compiled HTML file, or modify a window type contained in a compiled HTML file.

The Windows operating system enables programs to create what are called child windows. A child window is controlled by its parent in the following ways. A child window cannot be moved outside of the parent's window. Its position on the screen is automatically moved when the parent is moved (in other words, the child window retains its relative position within the parent when the parent is moved). When the parent window is told to hide itself, all of the parent's child windows (including any children of the child windows) will hide. If the parent is hidden, and told to show itself, all of the parent's child windows will display themselves.

The Windows operating system also allows a window to set its state to be hidden or visible. When the state of a window is hidden, the window and all of its children are not displayed. The window will still receive and process messages, and will retain its position on the screen, but will not display anything to the user to indicate its presence. When the state of a window is visible, the window and all of its children will be displayed. However, a window whose state is visible may not be visible to the user if the window is completely covered by a window that is on top of that window.

Figure 6A:
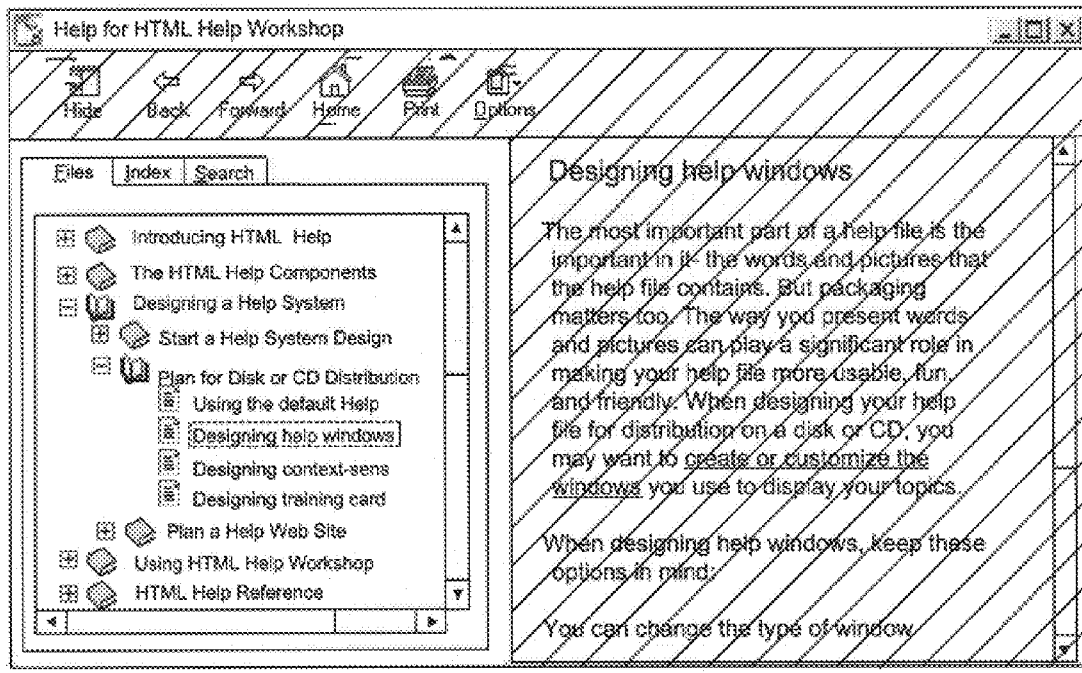
FIGS. 6A–D illustrates the navigational pane of the tri-pane window according to the present invention.
Figure 7:
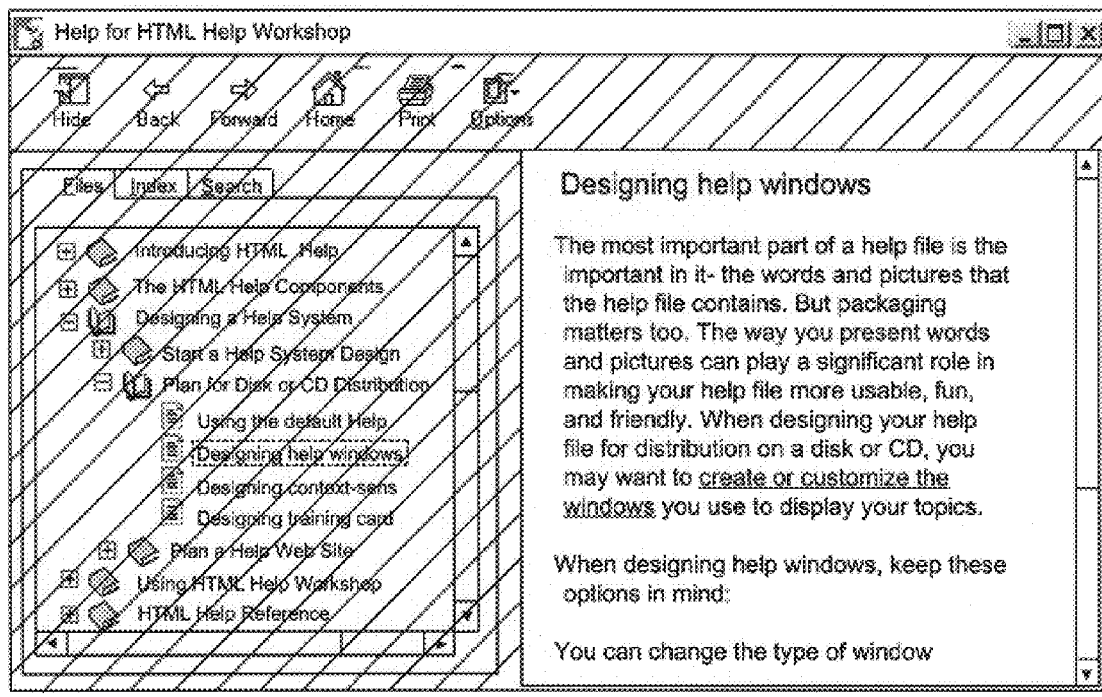
FIG. 7 illustrates the HTML pane of the tri-pane window according to the present invention.

According to the present invention, online or help information is provided through windows in a manner which offers greater flexibility to software developers by enabling more timely help information to computer users through the use of HTML files and the Internet. A tri-pane window is used which consists of three panes: a toolbar pane, a navigation pane, and an HTML pane. The toolbar pane shown in FIG. 5 consists solely of a toolbar containing one or more buttons. The navigation pane shown in FIG. 6A normally consists of two or more tabs that enable different forms of UI for navigating to different HTML files. The HTML pane in FIG. 7 is a host of shdocvw, which is a system component for displaying HTML files. The HTML pane of the present invention provides the user with information similar to the information provided in the selected content information pane as described with respect to the prior art, but the HTML pane offers distinct advantages over the prior art including but not limited to the inclusion of HTML content in the HTML pane, as more fully described below.

Figure 5:
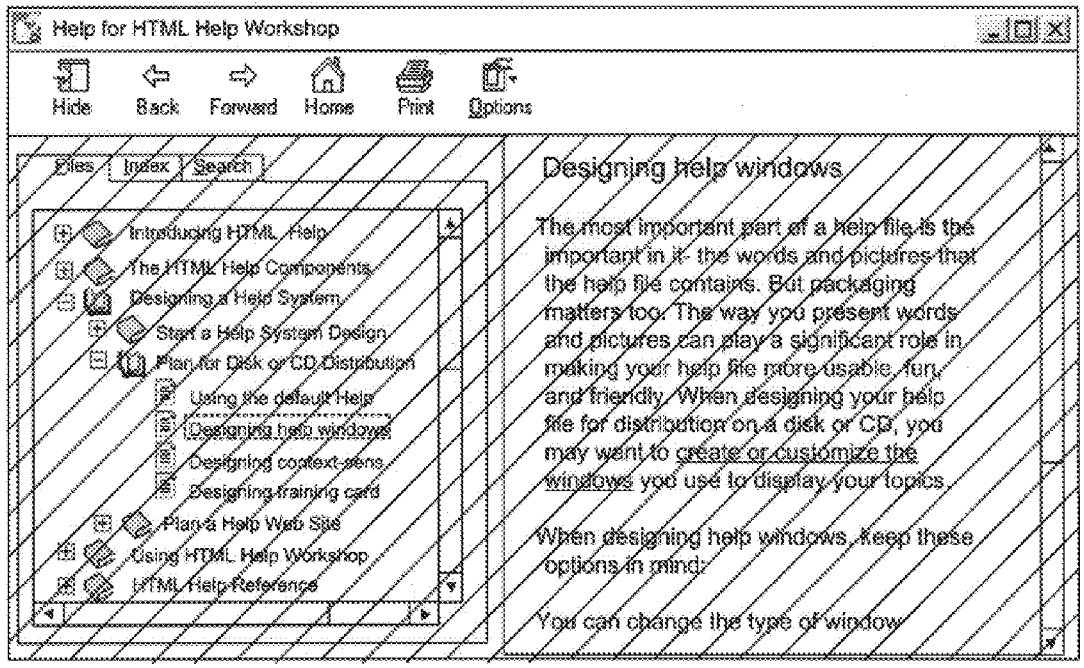
FIG. 5 illustrates the toolbar pane of the tri-pane window according to the present invention.

With the tri-pane window according to the present invention, and referring to the example shown in FIG. 5, the toolbar pane contains user-selectable options marked "Hide", "Back," "Forward," "Home," "Options" and "Print." A variety of user-selectable options may be provided in the toolbar consistent with the particular needs of the program being run. The navigational pane shown in FIG. 6A includes user-selectable tabs for "Files," "Index" and "Search" information. As shown in the figure, when the "Files" tab is selected, a listing of available information topics is displayed in the navigational pane.

Figure 6B:
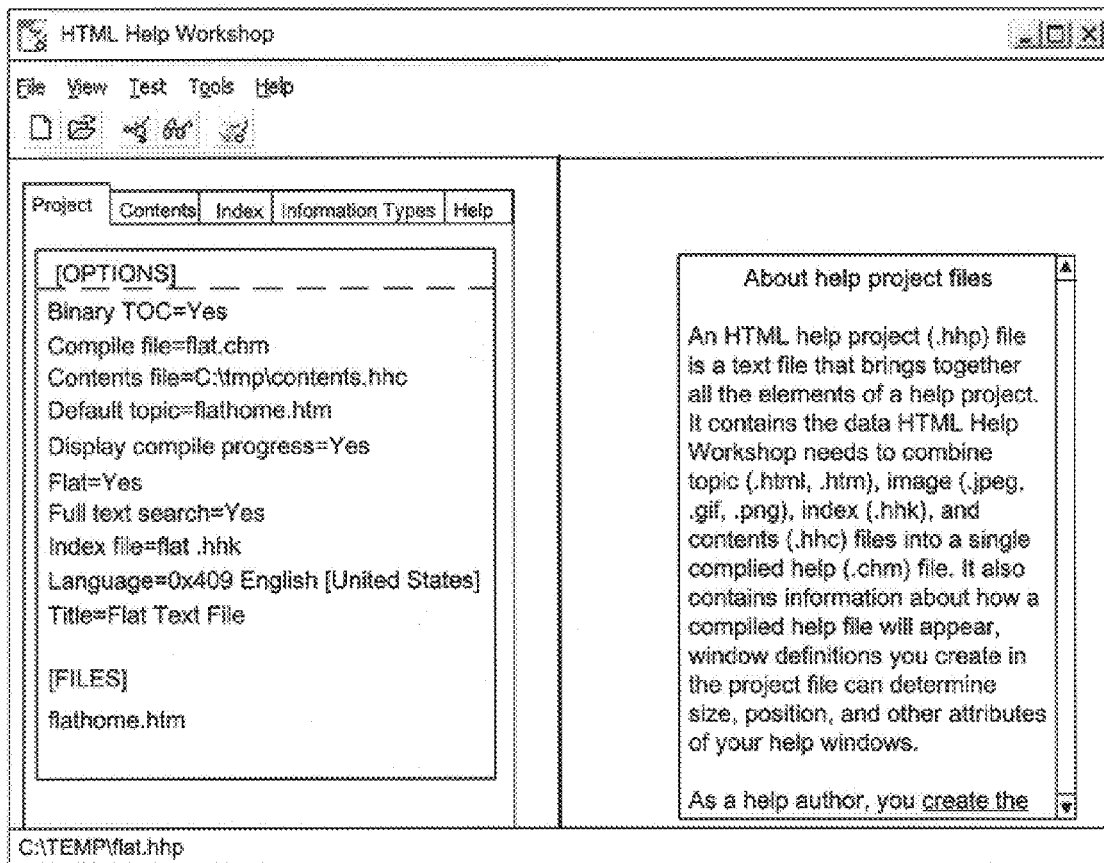
Figure 6C:
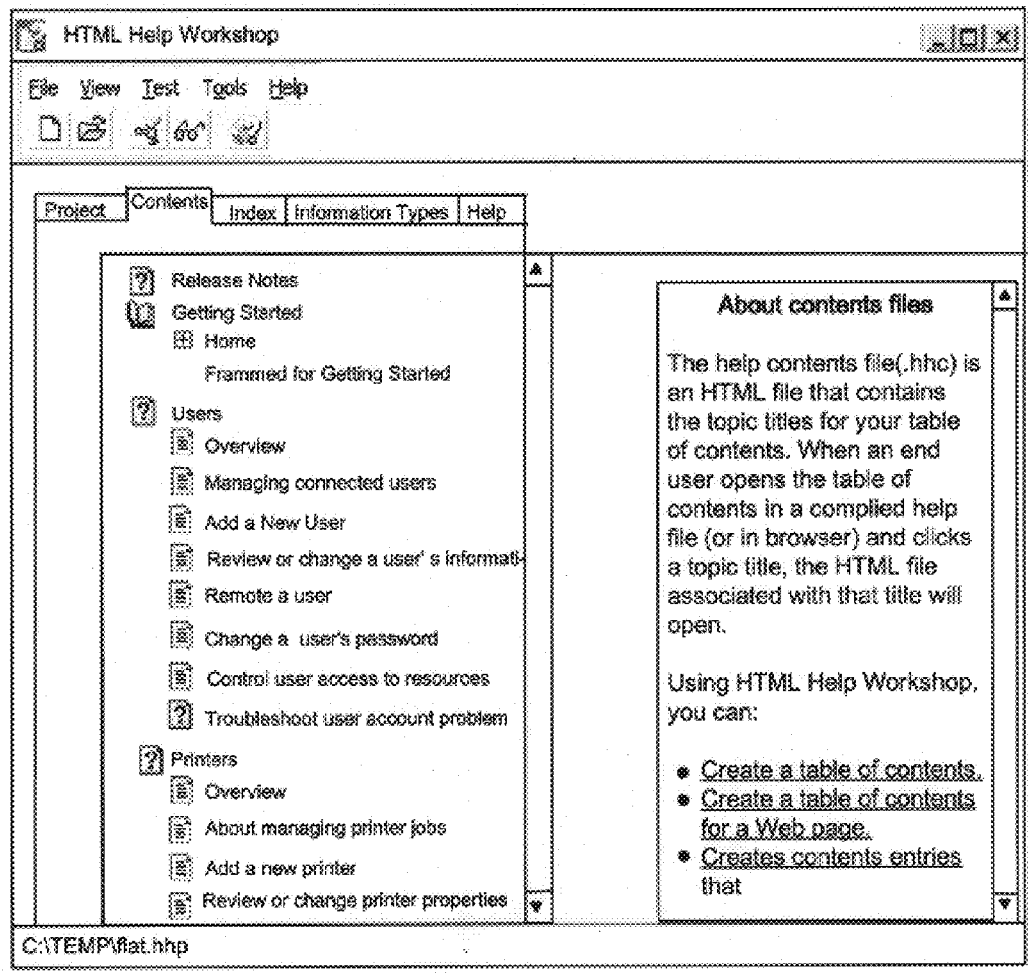
Figure 6D:
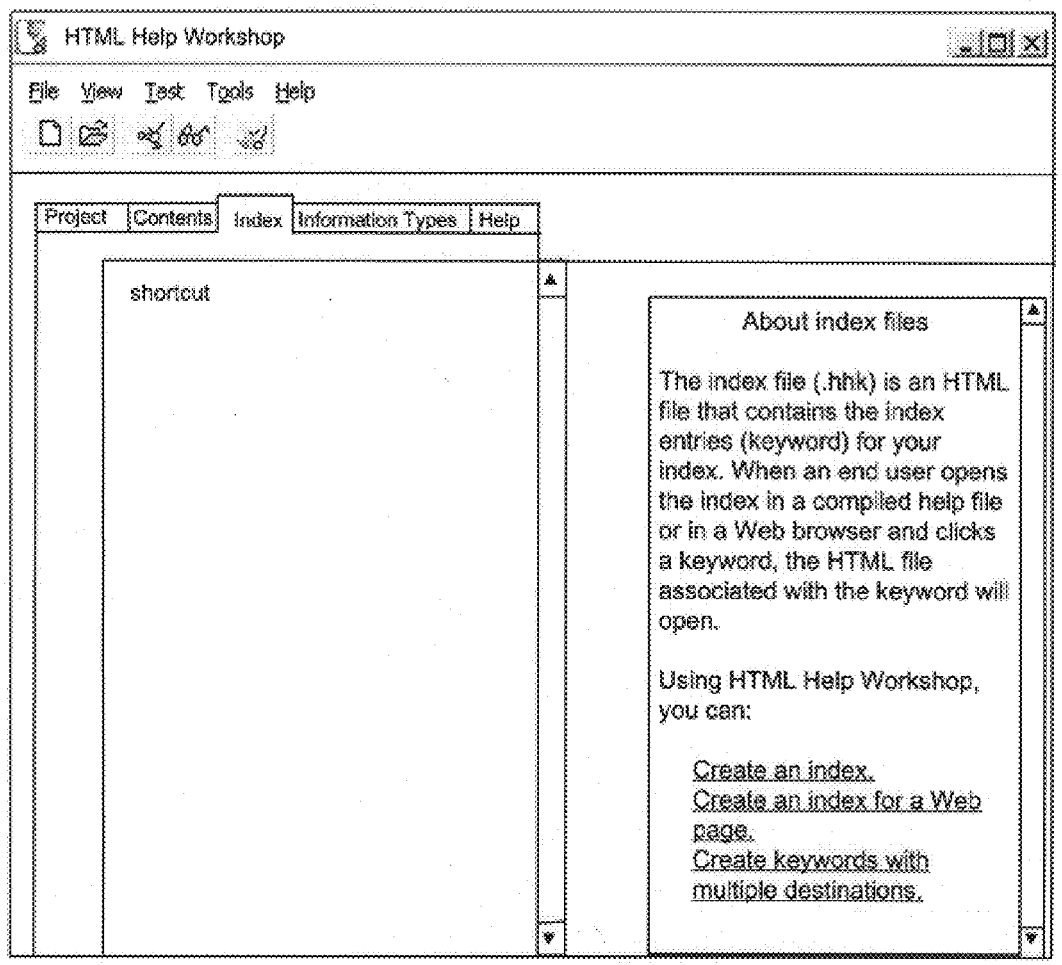

The navigational pane may present information in a variety of other ways. For example, FIG. 6B illustrates a navigational pane which includes tabs labeled "Project," "Contents," "Index," "Information Types" and "Help." When the Project tab is selected, the corresponding HTML pane displays information entitled "About help project files," as shown. Alternatively, when the Contents tab is selected, information concerning content files is provided in the HTML pane as shown in FIG. 6C. Likewise, as illustrated in FIG. 6D, when the Index tab is selected, information concerning index files is displayed in the HTML pane.

The HTML pane displayed in FIG. 7 contains the selected content information corresponding to the selected navigational information from the navigational pane. The information provided in the HTML pane can be located on CD-ROM, on a hard drive or any other storage and retrieval mechanism known in the art. The information may also contain multimedia or active content data. Significantly, the information displayed in the HTML pane contains HTML files which can be located anywhere (the Internet, CD-ROM, hard drive, etc.) which the user can select. Once selected, the user can access help information via the Internet, as an example. Thus, according to the present invention, the user is also able to click on links to other help information or related information via an HTML link provided within the help window.

The present invention thus offers significant advantages over the prior art approaches to providing help information to a user. In particular, because help information can be supplied in a variety of media software suppliers can provide more timely help information and can update the help information more readily as changes in its content become available. For example, a user might be sent a CD-ROM containing updated help information by a software manufacturer which could be accessed via the right-hand portion of the help window. In addition, extremely current help information can be accessed by the user via HTML links to the Internet which the software manufacturer can easily update on a daily basis, for example. Moreover, links can be provided to related topics and web sites of interest to the user.

Figure 8:
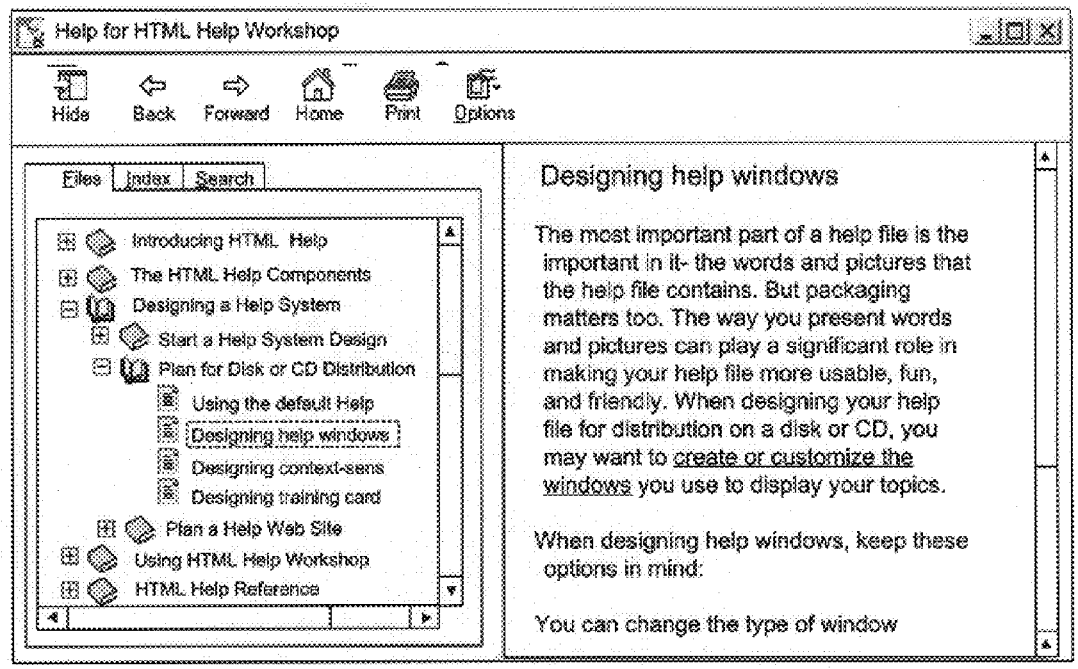
FIGS. 8 and 9 illustrate the Hide/Show button of the present invention.
Figure 9:
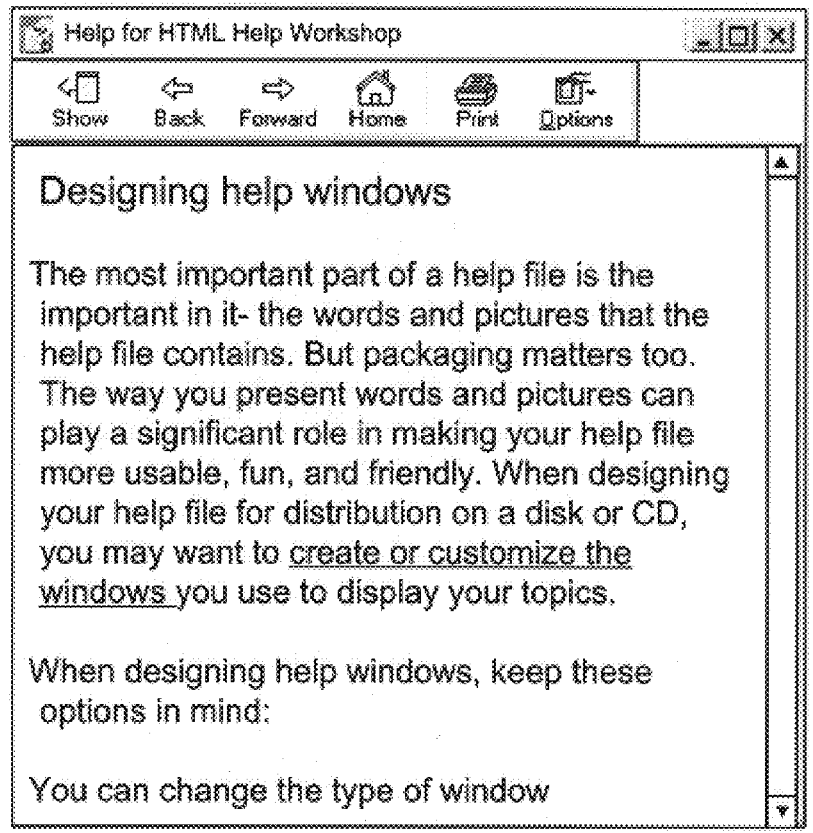

As further depicted in FIGS. 8 and 9, the present invention provides a user-selectable "Hide/Show" button in the toolbar pane. When the help window is first selected, both the navigational pane and the HTML pane are generally presented and the "Hide/Show" button preferable first appears as only a "Hide" button, as shown in FIG. 8. When the user selects the "Hide" button of FIG. 8, the navigational pane is no longer displayed. Specifically, selecting the "Hide" button of FIG. 8 removes the display of the navigational pane. In addition, the selection of the "Hide" button causes the toolbar to be reformatted, thus maintaining the display of only the reformatted toolbar and the HTML pane as shown in FIG. 9. The ability to hide the navigational pane allows the user to see the program which generated the need for help information and to readily apply the desired help information to the question presented by the program, thus making the help system easier for the user to use.

Similarly, when the user selects the "Show" button of FIG. 9, the navigational pane is again displayed simultaneously with the HTML pane and the toolbar returns to its original orientation. As a result, help information according to the present invention is easier to use than with the prior art since a user can easily and quickly identify the information desired in the navigational pane. Once the needed information is identified, the user can easily remove the navigational pane from being displayed while continuing to display the HTML pane which contains the help content information itself The present invention provides additional numerous advantages over the prior art. For example, a user can interactively and selectively access help information. Moreover, the number of mouse clicks required to access help information is reduced. A significant advantage of the present invention is that the information can be updated after a product ships since help information can be obtained from remote sources, such as the Internet. Also, the ability to take advantage of multimedia, and especially streaming multimedia, allows an enhanced interest level in the content information being presented to a user. Moreover, the inquisitive user can be linked to more detailed or related information. For example, an employee handbook can include links to relevant regulations on a government site. In addition, with the present invention, if a trouble shooting sequence doesn't solve the user's confusion, a link can be accessed to initiate a voice or video conference with support technicians. Another advantage of the present invention is found in the fact that costs can be significantly reduced since bulky, non-critical information (such as conceptual material, multimedia, graphics, tutorials, etc.) can be accessed via the Internet rather than being shipped with the software.

According to the present invention, the help window may always be expanded to the left in order to prevent the window from slipping off of the end of the desktop. Because the toolbar pane, navigational pane, and HTML pane are all within a single help window, the user has the ability according to the present invention to adjust the sizes of the navigational and HTML panes.

Alternatively, when a user clicks on content information, the navigation pane may automatically hide so that only the HTML pane remains displayed. This alternative feature of the invention saves the user from having to click on the "Hide" button to hide the navigational window pane, thereby allowing increased concentration on the issue the user is working with. With this variation, the user can easily select that the navigational pane again be displayed via the use of a "Back" button. Likewise, whenever a user requests help according to this variation of the invention, the help window automatically opens in an expanded state, that is, the help window opens with both the navigational window pane and the HTML window pane displayed. Again, in this way, the user is saved from having to operate the "Hide/Show" button. However, it should be noted that the "Hide/Show" button still functions as previously described and therefore may be accessed by the user, if desired.

In still another possible alternative, rather than contracting the navigation pane when the "Hide" button is selected, the HTML pane may be expanded. Another option includes animating the movement of the navigation pane in response to the "Hide/Show" button in order to show the movement of the navigational pane between positions.

Another novel feature of the present invention is that a navigational expansion is kept as a part of the history file of the user. In this way, the user can easily return to previously reviewed selected content information and can track his or her previous help accesses.

The present invention may also perform autosynchronization between the navigational pane and the HTML pane. According to this aspect of the present invention, as a user moves through the information displayed in the HTML pane, the system keeps track of the user's activities and location in the navigational pane containing, for example, a listing of available help files. This is true even if the navigational pane is hidden.

Figure 1:
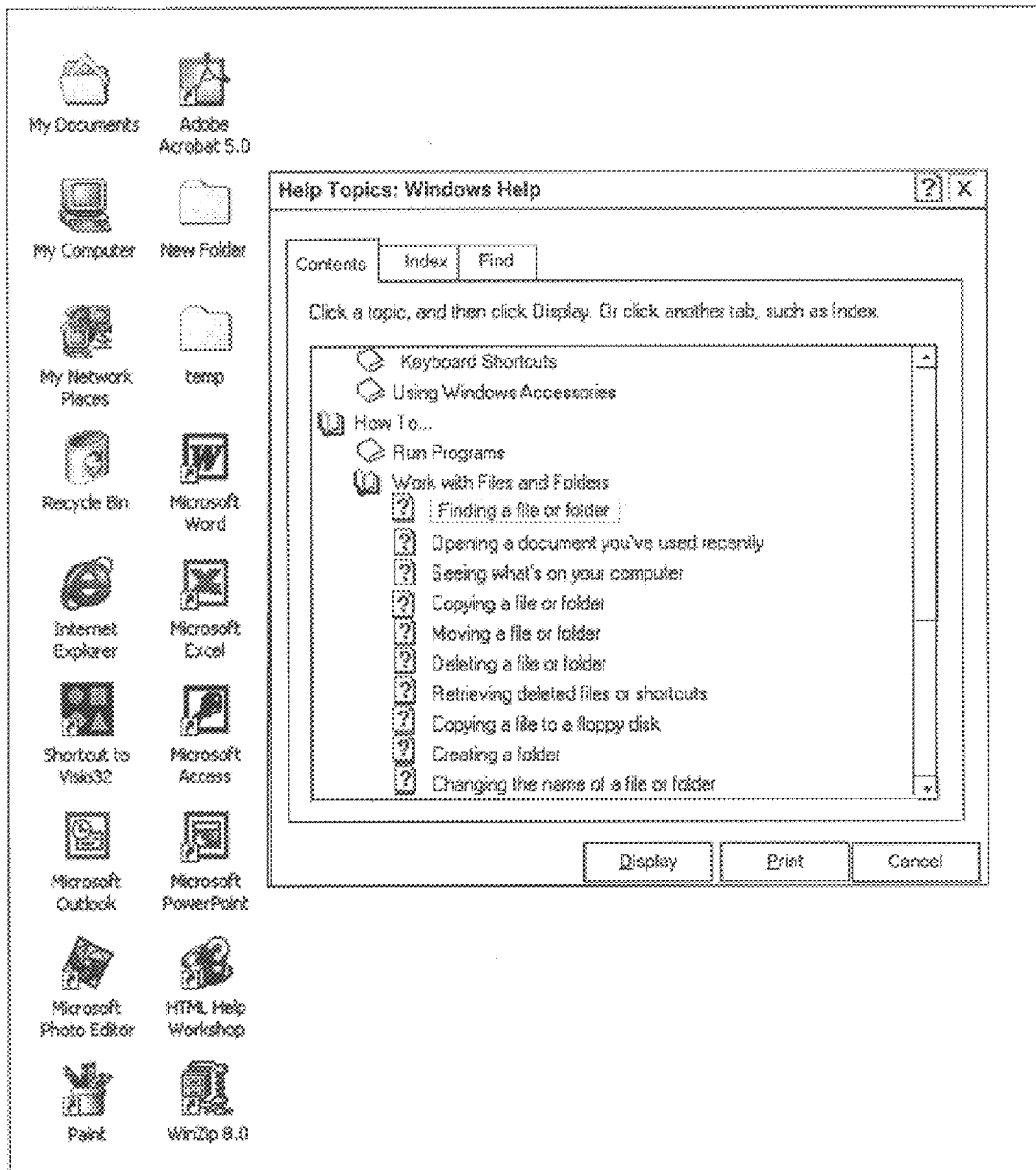
FIGS. 1 and 2 illustrate a problem with a prior art solution, provided by WINHELP 4, to providing a user with on-line help information.
Figure 2:
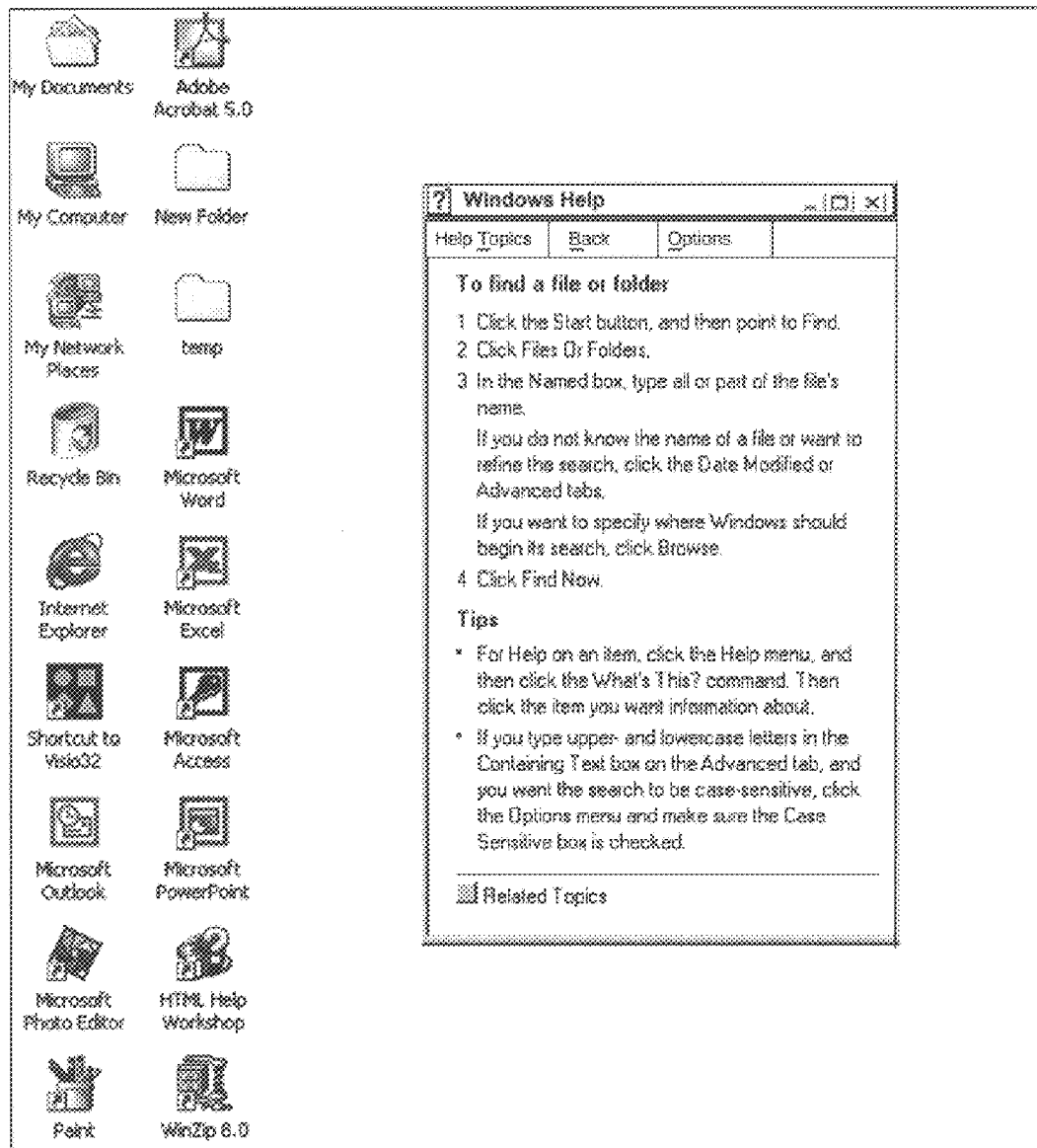
Figure 3:
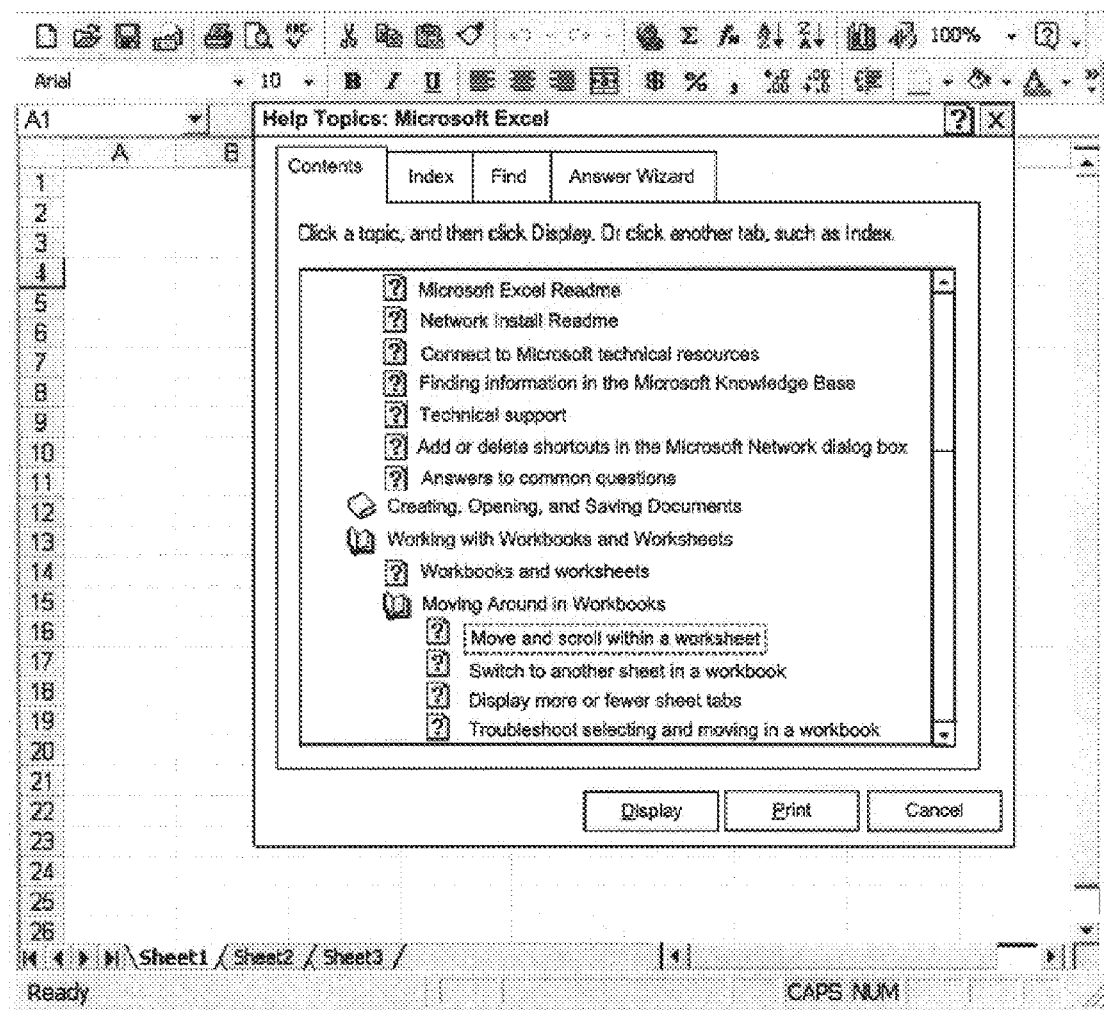
FIGS. 3 and 4 illustrate a second problem with the prior art solution provided by WINHELP 4 to providing a user with on-line help information.
Figure 4:
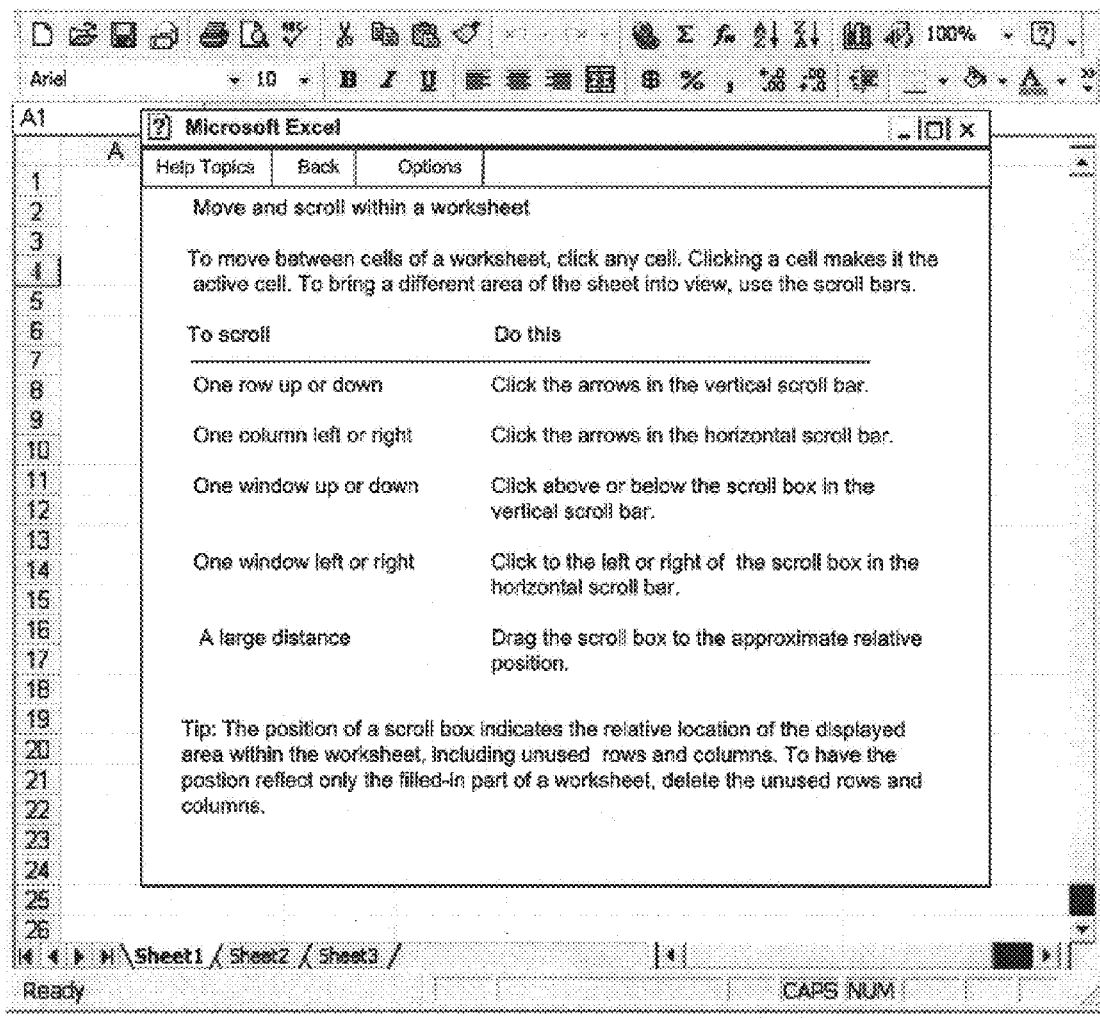
Figure 10:
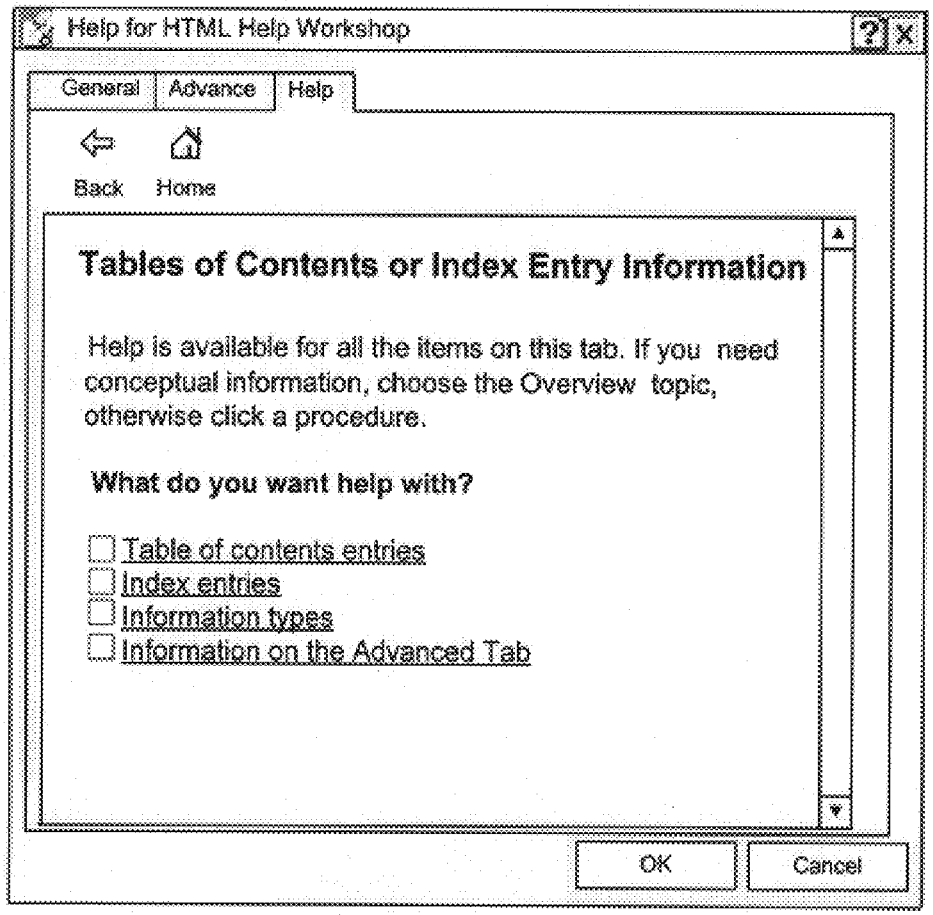
FIG. 10 illustrates a help tab embedded within a program according to the present invention.

FIG. 10 depicts another aspect of the present invention in which a help tab is embedded within a program, such as an operating system or application. The help tab contains help content embedded within the tab. As a result, the user can jump to desired selected content information and return back to the project being worked on with ease. In contrast, with the prior art as shown in FIGS. 3 and 4, the user was forced to close the help window before returning to the program, as previously described. The embedded help tab of the present invention allows increased flexibility in obtaining help information when a user is in a program. This feature of the present invention also facilitates the ability to switch between the program and help.

According to the present invention, help may also be provided in an embedded help window with tracking. More specifically, the help window may be context-sensitive in that it tracks what the user is doing in a program itself As a result, if the user switches to a different program, for example, the help information displayed can be automatically updated to conform to the user's activities. Embedding help within a program makes the help function easier for a user to use. Moreover, automatically tracking the user's action and providing concurrently pertinent help eliminates earlier problems in the prior art wherein a user had to seek the required help and then return to the program to perform the desired task.

A description of how the Hide/Show feature functions will now be described. Before displaying a window containing the improved help of the present invention, a program has the following choices about whether or not to show the navigation pane when the window is first created. As a first choice, the program can use a help author defined window which determines the initial state of the navigation pane. In the alternative, the program can retrieve window definitions from a compiled HTML file, and modify them before the window is created to set whether the navigation pane is shown or not. As a third alternative, the program can create its own window definition, and specify if the navigation pane is shown or not.

When a program creates a window containing Hide/Show capability, it creates a frame window and three child windows, referred to as panes. The top pane contains a toolbar (previously referred to as the toolbar pane), the left pane contains navigational UI (previously referred to as the navigational pane), and the right pane contains HTML content (previously referred to as the HTML pane). In addition to the three panes, a single child window is created, called a sizing window, between the navigation pane and the HTML pane that can be used to resize the width of these two panes. The navigation pane will contain one or more child windows that contain the navigational UI. If more then one navigational UI is present, then a Windows tab control will be created, and each navigational UI will be child of a specific tab.

When the user clicks the Hide button, or clicks outside of a window employing the improved help of the present invention and having an auto-hide/show property, the Help window according to the present invention performs the following actions. First, the sizing window that is between the navigation pane and the HTML pane is destroyed. Next, the navigation pane's window state is marked as hidden. This will automatically hide all child windows of the navigation pane window. After that, the rectangle of the outer frame window is retrieved, and the left position is increased by the current size of the navigation pane plus the size of the sizing window as in the following algorithm: (rcframe.left+((rcNavPane.right−rcNavPane.left)+(rcSize.right−rcSize.left))). Significantly, by increasing the left position, the left edge of the window moves towards the right edge, thereby reducing the width of the window.

The next step involves resizing the toolbar pane to fit the width of the client area of the outer frame window. If the resulting size can no longer display all of the buttons on a single line, then the toolbar buttons are wrapped to the next line, and the top of the HTML pane is reduced by the number of additional lines needed to display the toolbar. This ensures that the contents of the toolbar pane are displayed regardless of which panes are displayed in response to activation of the Hide/Show button.

Next, the Hide button is replaced with a Show button. This is accomplished by sending messages to the toolbar window telling it to hide the Hide button, and show the Show button. Both buttons are marked as having the same position in the toolbar, so that effectively one button replaces the other. An internal flag is activated to indicate that the current state of the navigation pane is hidden.

When the user clicks the Show button, or clicks anywhere within a window employing the improved help of the present invention and having an auto-hide/show property, the HTML Help window performs the following actions. First, the rectangle of the outer frame window is retrieved, and the left position is decreased by the current size of the navigation pane plus the size of the sizing window as in the following algorithm: (rcFrame.left−((rcNavPane.right−rcNavPane.left)+(rcSize.right−rcSize.left))). By decreasing the left position, the left edge of the window moves away from the right edge, thereby increasing the width of the window. Next, the left edge of the window is compared against the left edge of the desktop client area (the desktop, minus the right edge of the tray if the tray is on the left side of the screen). If the left edge of the expanded HTML Help window is not visible, the entire window is moved to the right until the left edge aligns with the left edge of the desktop client area. If there are any adjustments of the window's horizontal position, the right edge of the window is checked against the right edge of the desktop area, and if it is greater then the right edge of the desktop client area, the right edge of the HTML Help window is reduced until it is the same as the right edge of the desktop client area. This adjustment ensures proper positioning of the help window on the display and prevents losing either the right or left edge of the help window.

The navigation pane window is shown which will in turn cause all child windows of the navigation pane window to be shown. The sizing window is created and placed between the navigation pane and the HTML pane. Next, the toolbar window is resized to fit the width of the client area of the outer frame window. If this resizing results in their being fewer lines necessary to display all of the buttons, then the height of the HTML pane is adjusted to fill the free vertical space. The Show button is replaced with a Hide button. This is done by sending messages to the toolbar window telling it to hide the Show button, and show the Hide button.

Finally, an internal flag is activated to indicate that the current state of the navigation pane is shown.

The help tab functionality of the present invention is explained as follows. To display a dialog containing a help tab, the program must take the following steps. First, the program must create a dialog template containing a tab control. One of the tabs preferably should be marked as a Help tab. A dialog procedure is then created for the Help tab. When the dialog procedure receives a message indicating that the dialog is being created, it creates an HTML Help window definition. The window style of the window definition is set to a child window, and the style property is set to remove all default window styles. The client area of the dialog is retrieved, and then reduced by the amount of border desired around the HTML window. This rectangle is then specified in the window definition. The default HTML file is set for the window definition, and if a Home button is to be displayed, then the HTML file to display when the Home button is clicked is specified in the window definition.

Once the window definition is created, the HtmlHelp API is called to create that window type, followed by a call to the HtmlHelp API to display the default HTML file. The call to display the HTML file will create and display the HTML window which will then appear embedded into the dialog.

Figure 11:
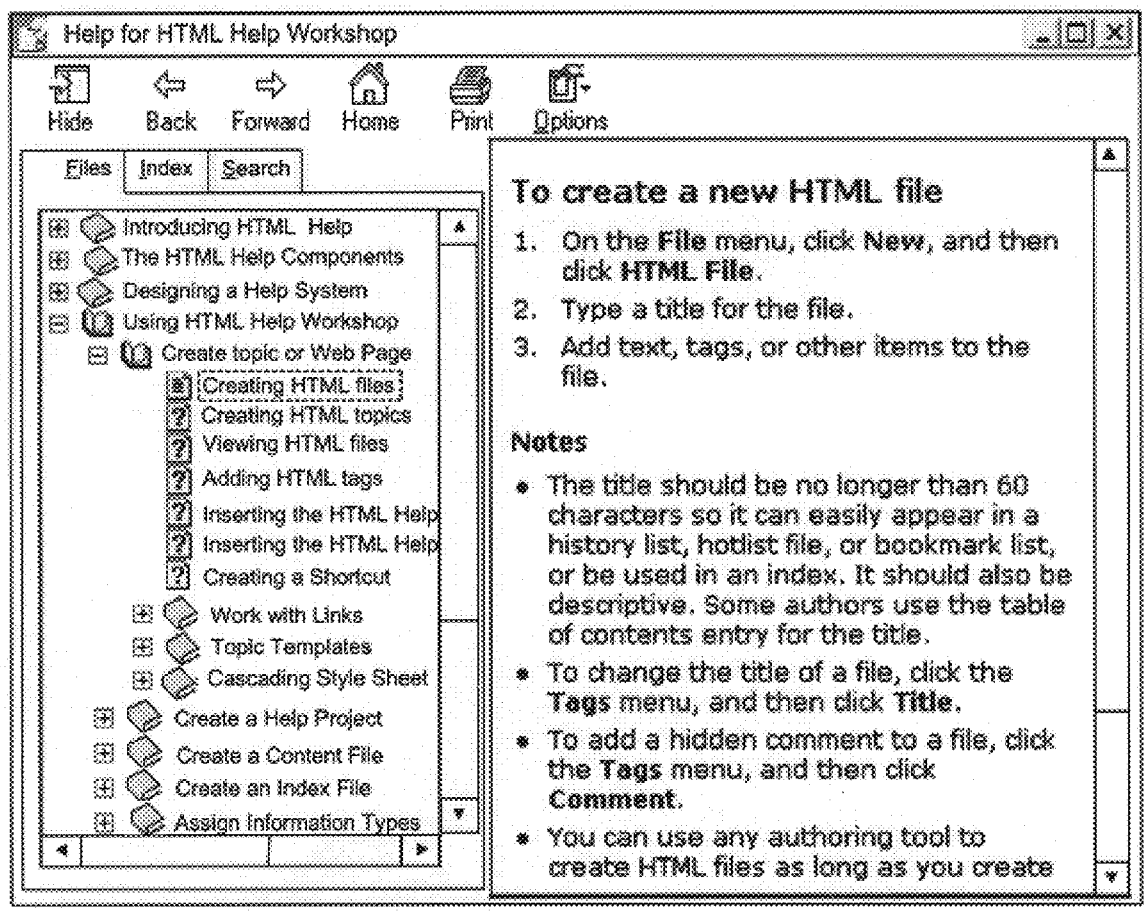
FIG. 11 illustrates a problem faced by a computer user attempting to create a new HTML file in order to implement a help system.

The automatic Hide/Show of the present invention is achieved as follows. When a user needs assistance in using a program, he or she can go to the help menu and bring up a help menu. From there, the user needs to navigate to the topic containing the information relevant to the problem he or she is having. Once that information is found, it may be useful to leave the help information displayed while the user returns to the program to continue their work. This is particularly true when the help information contains a procedure. In this case, the user needs that procedure displayed while they are following the procedure steps. While the user is working in the program, they no longer need the navigation pane used to get to that help information—yet if the navigation pane is still showing, the user may not be able to see enough of their program to perform the procedure. FIG. 11 shows an example where the user used help to find out how to create a new HTML file, but cannot even complete the first step of the procedure because help is covering the dialog needed to complete the first procedure step.

Figure 12:
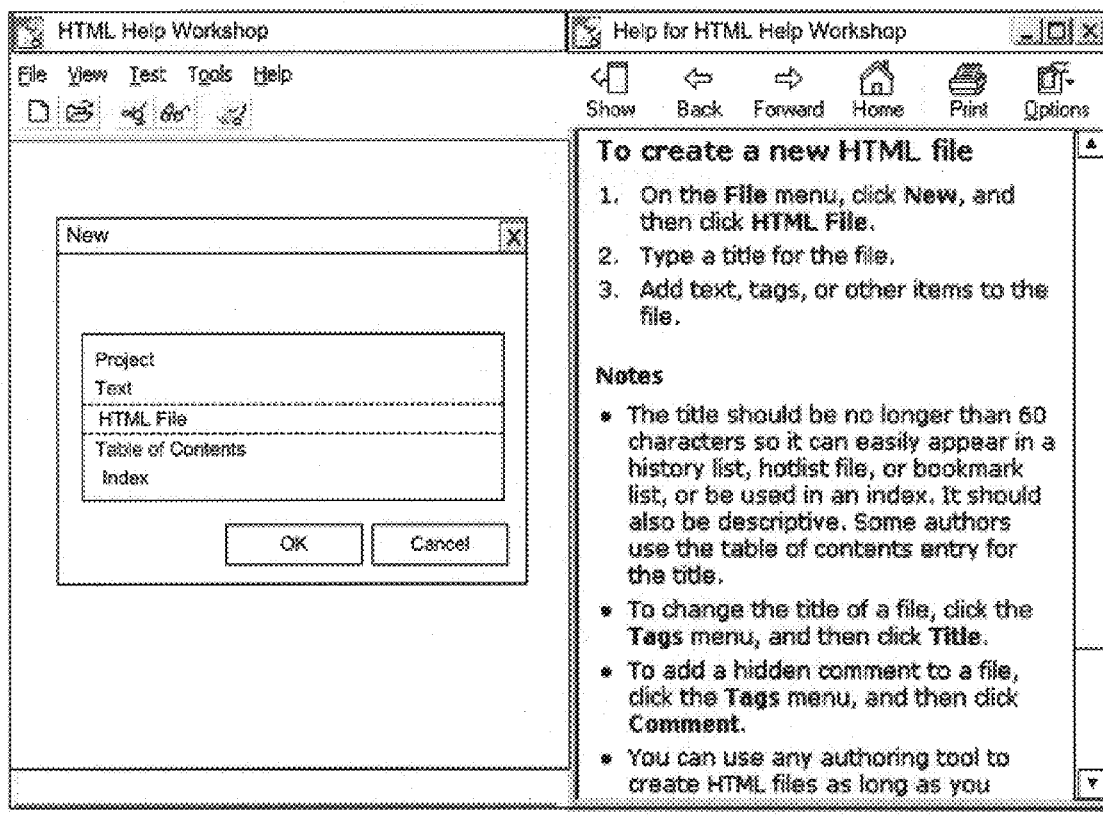
FIG. 12 illustrates the automatic Hide/Show function of the present invention.

The Hide button would remove enough of the window so that the user could see the procedure and at the same time work within the program. The problem is that users may not discover the Hide button, or fail to think of it because they are focused on solving a particular problem. The automatic Hide/Show functionality automatically hides the navigation pane when the user clicks outside of help, and shows the navigation pane when the user clicks within the help window. In FIG. 11, if the user followed the procedure, he or she would first click the File menu. Because the user clicked outside of help, the navigation pane would automatically go away, resulting in the screen shown in FIG. 12.

The implementation of the Hide/Show functionality of the present invention is described below. In a windows program, the window that has the focus is the window that receives keyboard input. This window is always active. The reverse is not true—a window that is active may not have the focus. This occurs when the active window has child windows, and one of the child windows has the focus. The automatic hide/show functionality responds only to gaining or losing activation—it is not impacted by gaining or losing the focus.

In Windows, messages can be sent or posted. A message that is sent is acted on immediately. A message that is posted is placed into a queue. Messages in this queue are processed in the order that they were posted to the queue. At any time, a program can look at the entire queue to determine what messages are waiting to be processed.

The automatic hide/show functionality is enabled in a HTML Help window when the window definition specifies that automatic hide/show functionality for that window. Whenever the outer HTML Help window gains or loses activation, it checks this property. If it is gaining activation it checks the following conditions:

Does the window have the automatic hide/show property?

Has the window already been created?

Is the navigation pane currently hidden?

If all three of these conditions are met, a message to expand the navigation pane is posted. The message is posted, rather then sent in case the user activated the help window by clicking on the show button. When the message to expand the navigation pane is received, the message queue is searched to see if there is a pending message to expand the navigation pane. The pending message will occur if the user clicks on the Show button. If such a message is pending, no action is taken on the automatic expansion message, and the window is expanded once the message from the show button is processed.

When the window loses activation, a message is sent to immediately close the navigation pane, provided the window has the automatic hide/show property and the navigation pane is not currently hidden.

The present invention thus provides improvements over prior art help systems such that a computer user can more readily gain access and utilize the desired help information. In addition, programs and help authors can create window types and define the properties of windows for use in providing online information to a computer user.

We claim:

1. A computer system in which help information relating to a program is provided to a user, comprising:

a user-selectable feature for requesting information; and a window responsive to activation of said user-selectable feature, the window comprising a user-selectable device for controlling said information displayed in said window, a toolbar pane, a navigational pane, and an HTML pane for displaying help information for the program, the help information being contained in HTML files store separately from the program.

2. A computer system as claimed in claim 1 wherein activation of said user-selectable device causes said window to expand in response to a first command and causes said window to contract in response to a second command.

3. A computer system as claimed in claim 2 wherein said first command is a show command and said second command is a hide command.

4. A computer system as claimed in claim 1, wherein said user-selectable feature is a help button and said user-selectable device is a hide/show button.

5. A computer system as claimed in claim 4 wherein said navigational pane is no longer displayed when a hide function of said hide/show button is activated and said navigational pane is displayed when a show function of said hide/show button is activated.

6. A computer system as claimed in claim 5 wherein said navigational pane includes multiple forms of navigation information.

7. A computer system as claimed in claim 6 wherein said multiple forms of navigational information are accessed by tabs.

8. A computer system as claimed in claim 7 wherein said tabs correspond to a table of contents, an index, and a search function.

9. A computer system as claimed in claim 5 wherein said display of said navigational pane is animated.

10. A computer system as claimed in claim 5 wherein said navigational pane, said HTML pane and said toolbar pane are coded into window structures; and
upon activation of said hide function of said hide/show button, said toolbar pane is reformatted to fit directly over said HTML pane.

11. A computer system as claimed in claim 1, wherein said HTML pane also displays HTML links and said separately stored HTML files are accessed via universal resource locators.

12. A computer system as claimed in claim 1 wherein said HTML pane also displays HTML links.

13. A computer system as claimed in claim 1, wherein said separately stored HTML files are accessed via universal resource locators.

14. A computer system as claimed in claim 1, wherein an item selected in said navigational pane is synchronized to said help information displayed in said HTML pane.

15. A computer system as claimed in claim 14 wherein selections made in said navigational pane by a user are stored and retrieved.

16. A computer system as claimed in claim 14 wherein said help information displayed in said HTML pane is retrieved from the Internet.

17. A computer system as claimed in claim 14 wherein said help information displayed in said HTML pane is retrieved from local storage.

18. A computer system as claimed in claim 14 wherein said help information displayed in said HTML pane is retrieved from a CD-ROM.

19. A computer system as claimed in claim 1 wherein said navigational pane is deleted when the HTML pane is activated by a user.

20. A computer system as claimed in claim 1 wherein said window is embedded within the program.

21. A computer system as claimed in claim 1, wherein the window further comprises a sizing pane.

22. A computer system as claimed in claim 21 wherein said sizing pane is provided between said navigational pane and said HTML pane.

23. A computer system as claimed in claim 1, wherein activation of said user-selectable device causes a first pane in said window to close and a second pane in said window to expand.

24. A computer system as claimed in claim 23 wherein said first pane is the navigational pane and said second pane is the HTML pane.

25. A computer system as claimed in claim 1 wherein a navigational expansion is maintained.

26. A computer system as claimed in claim 1 wherein said information is embedded within a dialog box.

27. A method for providing a user with help information relating to a program in a computer system, said method comprising:
providing a button for accessing information;
providing a window responsive to activation of said button by said user, said window comprising
a toolbar pane, the toolbar pane having a hide/show button for controlling information displayed in said window,
a navigational pane, and
an HTML pane for displaying help information relating to the program, the help information being contained in HTML files stored separately from the program.

28. In a computer system having a graphical user interface comprising a display and a user interface selection device, a method of providing a user with help information comprising the steps of:
opening a window in response to a use of said user interface selection device, said window comprising
a navigational pane,
an HTML pane for displaying help information for a program, the help information being contained in HTML files stored separately from the program, and
a hide/show button;
closing said navigational pane in response to activation of a hide portion of said hide/show button by said user interface selection device; and
opening said navigational pane in response to activation of a show portion of said hide/show button by said user interface selection device.

29. A computer-readable medium having computer-executable instructions for performing the following steps:
creating a window for providing help information, said window comprising
a toolbar pane,
a navigational pane and
an HTML pane for displaying help information for a software application that is contained in HTML files stored separately from the software application;
providing user-selectable means for controlling display of said help information; and
determining whether or not to display a navigational pane in said window for providing help information.

30. The computer-readable medium claimed in claim 29 wherein said computer-executable instructions are for performing said determining step based on a state of said user-selectable means.

31. The computer-readable medium claimed in claim 30 wherein said window further includes a sizing pane.

32. The computer-readable medium claimed in claim 31 further including computer-executable instructions for recalculating a size of said window when said determining step results in a decision not to display said navigational pane.

33. The computer-readable medium claimed in claim 32 further including computer-executable instructions for removing said sizing pane when said determining step results in a decision not to display said navigational pane.

34. The computer-readable medium claimed in claim 31 further including computer-executable instructions for recalculating a size of said HTML pane when said determining step results in a decision to display said navigational pane.

35. The computer-readable medium claimed in claim 34 further including computer-executable instructions for recalculating a size of said toolbar pane when said determining step results in a decision to display said navigational pane.

36. The computer-read medium claimed in claim 34 further including computer-executable instructions for restoring said sizing plane when said determining step results in a decision to display said navigational pane.

37. A computer-readable medium having computer-executable instructions for performing the following steps:
creating a dialog template containing a plurality of tabs and a tab control;
creating a dialog procedure for at least one of said tabs;
creating a help window definition; and
embedding HTML information within said help window definition.

* * * * *

UNITED STATES PATENT AND TRADEMARK OFFICE
CERTIFICATE OF CORRECTION

PATENT NO. : 6,456,303 B1
DATED : September 24, 2002
INVENTOR(S) : Ralph E. Walden et al.

It is certified that error appears in the above-identified patent and that said Letters Patent is hereby corrected as shown below:

Column 10,
Line 10, "rcframe.left" has been replaced with -- rcFrame.left --,
Line 55, "losing either" has been replaced with -- loss of either --.

Column 12,
Line 46, "store" has been replaced with -- stored --.

Signed and Sealed this

Nineteenth Day of August, 2003

JAMES E. ROGAN
*Director of the United States Patent and Trademark Office*